(No Model.)
M. W. ILES.
APPARATUS FOR SEPARATING MATTE FROM SLAG.
No. 558,647. Patented Apr. 21, 1896.
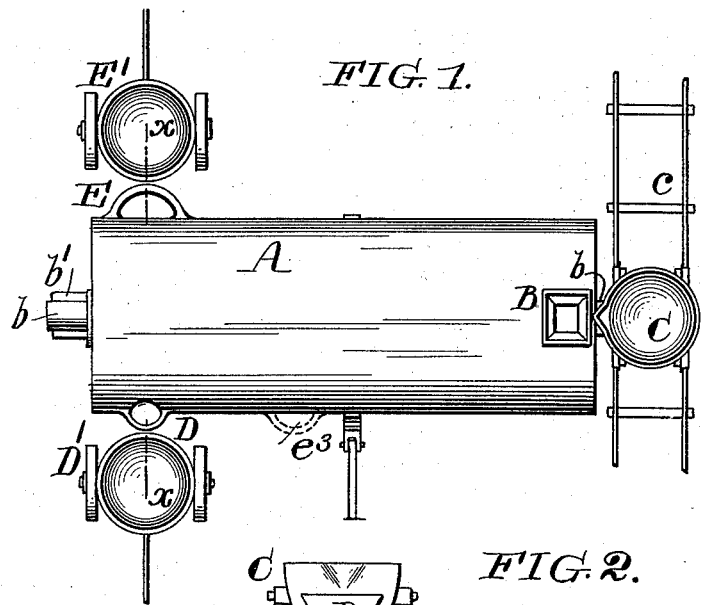
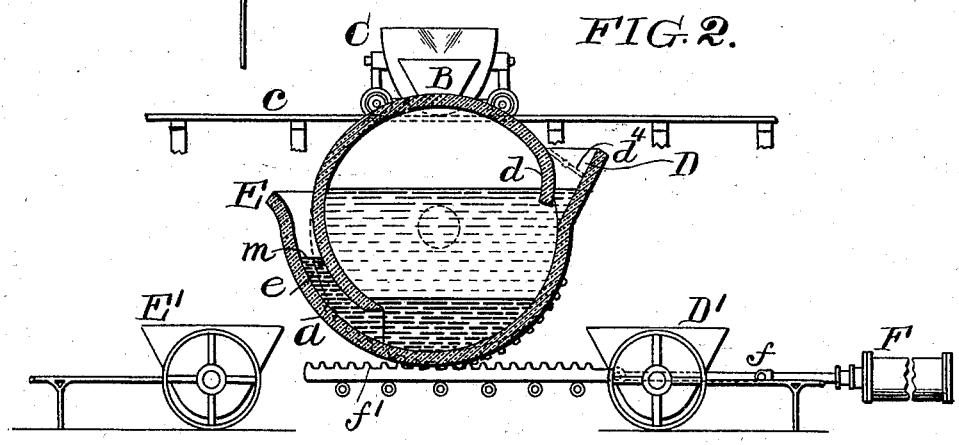
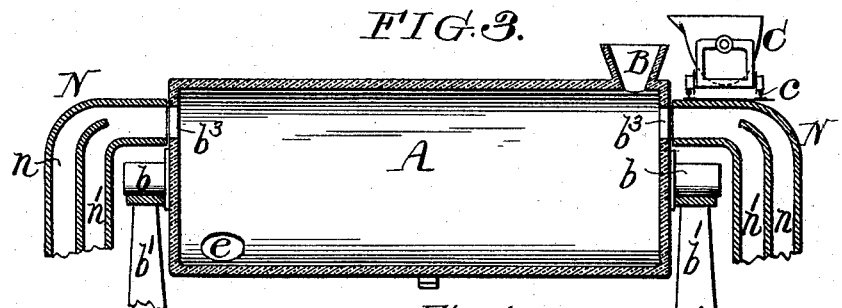
WITNESSES: INVENTOR:

UNITED STATES PATENT OFFICE.

MALVERN W. ILES, OF DENVER, COLORADO.

APPARATUS FOR SEPARATING MATTE FROM SLAG.

SPECIFICATION forming part of Letters Patent No. 558,647, dated April 21, 1896.

Application filed September 20, 1894. Serial No. 523,554. (No model.)

*To all whom it may concern:*

Be it known that I, MALVERN W. ILES, a citizen of the United States, residing in the city of Denver, in the county of Arapahoe, in the State of Colorado, have invented a new and useful Improvement in Apparatus for Separating Matte from Slag, of which the following is a true and exact description, reference being had to the accompanying drawings, which form a part thereof.

My invention relates to an apparatus for separating matte from slag; and it consists, in its main features, in providing a suitable receptacle having two spouts, one for slag, opening from the receptacle at a suitable height, and another, connected by a suitable conduit to the space near or at the bottom of the receptacle, with means for tipping the receptacle. The two spouts are preferably arranged one on one side and the other on the other side of the receptacle, so that by tipping it one way and depressing one spout matte will flow out and by tipping it the other way and depressing the other spout slag will flow.

Other detailed improvements are shown in the drawings, and the nature of these improvements will be pointed out in connection therewith.

Referring to the drawings which illustrate my invention, Figure 1 is a plan view of the preferred form of the apparatus, showing also a slag-pot in position to dump the mixed matte and slag into the separating apparatus. Fig. 2 is a section taken on the line $x\ x$ of Fig. 1. Fig. 3 is a vertical section of a modified form of the apparatus, showing it provided with inlets for gaseous fuel or other heating-gases to prevent the cooling of the contents of the separator; and Fig. 4 is a section similar to that shown in Fig. 2, but showing a modified construction.

A is a suitable receptacle, preferably cylindrical in form, as shown, and having a hopper B, through which the mixed matte and slag is dumped.

The receptacle A is provided with a slag-spout D, which opens from the receptacle at any suitable distance from the bottom, and also with a matte-spout, which is connected to the space near or at the bottom of the apparatus by a suitable conduit. This matte-spout may be situated on the same side of the apparatus as the slag-spout, and when the receptacle is tipped by a suitable motor, referred to more particularly hereinafter, the slag will flow from the top of the receptacle through the spout D, and the matte collected at the bottom of the receptacle will flow therefrom through the conduit to the matte-spout and into a suitable matte-pot. Suitable valves or gates may be provided to govern the flow of the matte or slag. Such an arrangement is indicated in dotted lines in Fig. 1 and in full lines in Fig. 4, $e^2$ being the matte-conduit, and $e^3$ the matte-spout, arranged on the same side of the receptacle as the slag-spout.

$e^4$ and $d^4$ indicate the valves which may be employed. I much prefer, however, the arrangement shown in full lines in Figs. 1 and 2, where the matte-spout is arranged on the opposite side of the receptacle from the slag-spout, so that by tipping the receptacle one way matte can be poured off and by tipping it the other way slag will flow.

E indicates a matte-spout so arranged.

$e$ indicates the conduit opening into the space near or at the bottom of the receptacle, so that matte will flow from this spout unmixed with slag.

$m$, Fig. 2, indicates the level of the matte in conduit $e$, this level being lower than that of the slag in the receptacle, because of the greater specific gravity of the slag.

E' indicates a suitable matte-pot, and D' a slag-pot arranged in position to receive the matte or slag poured from the spouts E or D when they are properly depressed. I also prefer, as shown in Fig. 1, to arrange the spouts D and E near one end of the receptacle and the hopper B near the other end, so that the matte will have full opportunity to subside in traversing the length of the receptacle.

The receptacle is so arranged that it can be tipped. As shown, it is provided with trunnions $b$, which are mounted in suitable bearings $b'$. A motor F, on the plunger or piston rod $f$ of which is arranged a suitable rack $f'$, which engages with teeth $a$ on the body of the apparatus, serves to tip the receptacle in either direction, so as to depress either the matte or the slag spout. Of course any other suitable tipping means could be employed.

The slag pot or car C, which brings the mixed slag and matte from the furnaces to the separator, is very conveniently run upon an elevated track c, so situated that the contents can be directly dumped into the separator. In some cases I prefer to provide the receptacle with inlets for heating-gases or gaseous fuel, so that the receptacle will act as a furnace and the contents be maintained at a high heat. Such an arrangement is shown in Fig. 3, where the receptacle is provided with openings at $b^3$ and where conduits N, having suitable passages, as $n$ $n'$, for gas and air, or for other heating-gases, are adapted to register with the openings $b^3$ in the receptacle. When the receptacle acts as a furnace, I prefer to provide a plate or lip $d$, as shown in Fig. 2, which will project below the level of the slag in the cylinder and prevent the escape of the heated gases from the slag-spout opening. The lip $d$ may also be used where the receptacle does not act as a furnace, though not then so necessary.

Having now described my invention, what I claim as new, and desire to secure by Letters Patent, is—

1. An apparatus for separating matte from slag, consisting of a suitable pivoted receptacle having two spouts, one for slag and one for matte, and a conduit leading from near the bottom of the receptacle to the matte-spout, in combination with means for tipping the pivoted receptacle so as to depress the spouts and permit the matte and slag to flow off through their appropriate spouts.

2. An apparatus for separating matte from slag, consisting of a suitable pivoted receptacle having two spouts, one on one side thereof for slag and one on the other side thereof for matte, and a conduit leading from near the bottom of the receptacle to the matte-spout in combination with means for tipping the receptacle in either direction so as to depress either the matte or the slag spout as may be desired below the level of the slag in the receptacle.

3. An apparatus for separating matte from slag consisting of a suitable furnace having two spouts, one for slag and one for matte, and a conduit leading from near the bottom of the furnace to the matte-spout, in combination with means for tipping the receptacle so as to depress the spouts and permit the contents thereof to flow off, and means for heating the contents of the furnace.

4. An apparatus for separating matte from slag, consisting of a suitable pivoted receptacle having two spouts, one on one side thereof for slag and one on the other side thereof for matte, a conduit leading from near the bottom of the receptacle to the matte-spout, in combination with means for tipping the receptacle so as to depress either the matte or the slag spout as may be desired below the slag-level of the receptacle, and conduits for gaseous fuel or other heating-gases leading into the receptacle so as to keep the contents thereof at a high heat.

5. An apparatus for separating matte from slag, consisting of a receptacle having a suitable inlet-hopper B near one end, a slag-spout on one side thereof, a matte-conduit opening from near the bottom of the receptacle and leading up to a suitable matte-spout on the opposite side of the apparatus from the slag-spout, in combination with an elevated track on which cars can be run into a position from which their charges can be poured into the receptacle, and means for tipping the receptacle so as to discharge either slag or matte.

MALVERN W. ILES.

Witnesses:
JOHN S. WILLIAMS,
D. A. JONES.